United States Patent [19]

Grosse-Rhode

[11] 3,767,231

[45] Oct. 23, 1973

[54] EXTENDIBLE TOWING TONGUE

[76] Inventor: Tony W. Grosse-Rhode, c/o 1-M Products Inc., 2442 N. 84th St., Omaha, Nebr. 68134

[22] Filed: Feb. 14, 1972

[21] Appl. No.: 225,775

[52] U.S. Cl. .............................. 280/482, 280/478 R
[51] Int. Cl. .............................................. B60d 1/14
[58] Field of Search ...................... 280/482, 478 R

[56] References Cited
UNITED STATES PATENTS

| | | | |
|---|---|---|---|
| 3,326,573 | 6/1967 | Neitzey | 280/482 |
| 2,658,769 | 11/1953 | Forney | 280/482 |
| 3,556,561 | 1/1971 | Gingue | 280/482 X |
| 2,925,287 | 2/1960 | Morris | 280/482 |
| 3,032,353 | 5/1962 | Williams et al. | 280/482 X |
| 2,179,439 | 11/1939 | Trow | 280/482 |

Primary Examiner—Leo Friaglia
Attorney—Harvey B. Jacobson

[57] ABSTRACT

A draft tongue including first and second telescoped members extendible and retractable relative to each other and including first and second coacting structure limiting relative extension and retraction, respectively, of the members. Third coacting structure is carried by the members for releasably retaining the members in relative retracted positions. The first coacting structure for limiting relative extension of the members is enclosed entirely within the latter.

8 Claims, 4 Drawing Figures

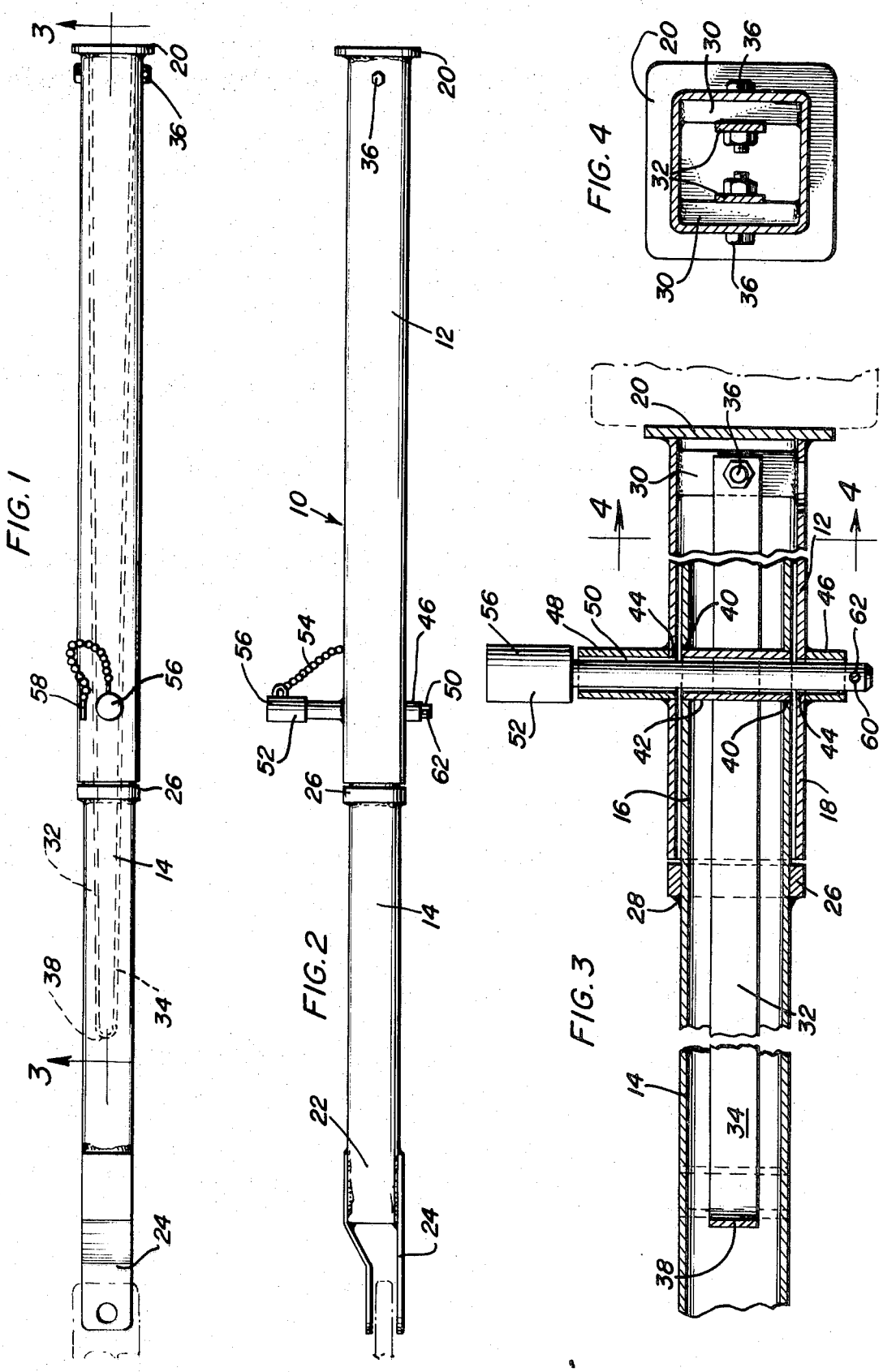

3,767,231

EXTENDIBLE TOWING TONGUE

The extendible towing tongue of the instant invention has been specifically designed to provide an extendible and retractable draft tongue for use in conjunction with farm equipment and which will be inexpensive to market. However, it is to be noted that the draft tongue will also find uses in other related fields of invention.

The towing tongue may be utilized for attaching a trailing vehicle to a towing vehicle and is designed to facilitate connection of the vehicles without requiring a fixed relative position between the trailing and towing vehicles at the time of connection. The tongue or hitch consists essentially of a fixed tube and an extension tube telescoped within the fixed tube for extension and retraction relative to one end thereof. An elongated U-shaped strap is disposed within the fixed tube and has its free ends secured to the other end of the fixed tube with the closed end of the strap also telescoped into the inner tubular member which is in turn provided with a diametric sleeve slidable between the legs of the U-shaped strap during extension and retraction of the inner tube and engageable with the closed end of the U-shaped strap to limit extension of the inner tube. Also, the outer tube includes diametrically aligned radial apertures with which the diametric sleeve carried by the inner tube is registered when the latter is in its fully retracted position thereby enabling a diametric locking pin to be passed through the apertures formed in the outer tube as well as the diametric sleeve secured through the inner tube to maintain the inner tube in its retracted position.

The main object of this invention is to provide a draft tongue that may be marketed at a low cost and utilized to couple a trailing vehicle to a towing vehicle without requiring fixed relative positioning of the trailing and towing vehicles at the time of connection.

Another object of this invention is to provide a draft or towing tongue or hitch in accordance with the immediately preceding object and constructed in a manner whereby the stationary portion of the hitch may be readily secured to a vehicle to be trailed and the extendible portion of the hitch may be readily removably coupled to a towing vehicle.

Yet another object of this invention is to provide a towing hitch of the extendible type and which includes structure by which the extendible portion of the hitch may be automatically secured in its fully retracted position upon movement of the extendible portion to the retracted position.

A final object of this invention to be specifically enumerated herein is to provide a towing tongue in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of the towing tongue in a fully retracted position;

FIG. 2 is a side elevational view of the assemblage illustrated in FIG. 1;

FIG. 3 is a fragmentary enlarged longitudinal vertical sectional view taken substantially upon the plane indicated by the section line 3—3 of FIG. 1 and with an alternate fully extended position of the extendible portion of the towing tongue illustrated in phantom lines; and FIG. 4 is a transverse vertical sectional view taken substantially upon the plane indicated by the section line 4—4 of FIG. 3.

Referring now more specifically to the drawings, the numeral 10 generally designates the towing tongue of the instant invention. The tongue 10 includes a first outer tubular section 12 and a second inner tubular section 14 which includes a first end portion 16 thereof telescoped into a first end 18 of the tube 12. The second end of the tube 12 includes an end plate 20 which closes the second end and comprises a mounting plate whereby the first section may be secured to a vehicle which is to be towed.

The second end portion 22 of the second section 14 has a tow hitch 24 supported therefrom and a stop collar 26 is disposed on the second inner section 14 and secured thereto as at 28 outwardly of the first end of the first section 12.

A plurality of upstanding opposite side reinforcing plates 30 are secured within the second base end of the first tube or section 12 and the free ends of the legs 32 of an elongated U-shaped strap 34 are secured to the base end of the outer tube 12 and the reinforcing plates 30 by means of fasteners 36. The ends of the legs 32 remote from the reinforcing plates 30 are interconnected by means of a generally semi-cylindrical and integral bight portion 38 and the first end 16 of the inner tube or section 14 has a pair of diametrically aligned radial bores 40 formed therein and a diametric sleeve 42 extends through the inner section or tube 14 and has its opposite ends secured in the apertures or bores 40.

The sections 12 and 14 are extendible and retractable relative to each other and when the section 14 is fully retracted the stop collar 26 is abutted with the end face of the outer tube 12 remote from the plate 20. Also, it will be noted that the outer tube 12 has a pair of diametrically aligned radial apertures 44 formed therein and that an axially short lower sleeve member 46 is secured to the underside of the outer tube 12 in alignment with the lowermost aperture 44 and a longer upper sleeve 48 is secured to the upper surface of the outer section 12 in alignment with the upper aperture 44.

When the section 14 is in the fully retracted position, the apertures 40 and 44 as well as the sleeves 42, 46 and 48 are aligned whereby the diametrically reduced shank portion 50 of a locking bolt 52 may be dropped downwardly through the sleeves 48, 42 and 46 in order to releasably secure the inner tube or section 14 in the fully retracted position. It will be further noted that an elongated flexible tension member 54 is provided and has one end secured to the head 56 of the bolt 52 and the other end secured to an anchor lug 58 carried by the outer tube or section 12, the tension member 54 being of a length to prevent full withdrawal of the shank portion 50 of the bolt 52 from the upper end of the sleeve 48 although the length of the tension member 54 is sufficient to enable the bolt 52 to be upwardly displaced above the sleeve 42. As a further safety factor, the lower end of the shank portion 50 projects downwardly through the lower sleeve 46 and has a diametric bore 60 formed therein through which a lock pin 62 may be secured to prevent upward displacement of the bolt 52.

In operation, the inner tube 14 is secured in the retracted position with the stop collar 26 abutted against the adjacent end of the outer tube 12 by means of the bolt 52. When it is desired to extend the section or tube 14, the bolt 52 is elevated sufficiently to raise the lower end of the shank portion thereof upwardly into the sleeve 48. Thereafter, the section 14 may be extended, at least slightly, to misalign the sleeve 42 with the lower end of the sleeve 48 and the bolt 52 may then be released. Thereafter, the section 14 may be further extended the desired amount and coupled to the towing vehicle. Extension of the inner tube or section 14 is limited by engagement of the diametric sleeve 42 with the semi-cylindrical bight portion 38 of the U-shaped member 34 and thus the sleeve 42 serves not only to limit extension of the inner tube or sleeve 14 but also to prevent the tube 14 from being extended from its fully retracted position.

The tubes 12 and 14 are rectangular in cross-sectional shape so as to prevent relative rotation of the tubes and ensure that the sleeve 42 will be aligned with the sleeves 46 and 48 when the tube 14 is shifted to its fully retracted position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A draft tongue comprising first and second members supported from each other for guided lengthwise extension and retraction relative to each other, first and second means carried by said members, limiting relative extension and retraction, respectively, thereof, and third means carried by said members releasably retaining said members in relative retracted positions, said first member including a laterally projecting abutment and said second member including a lengthwise extending U-shaped member including a pair of longitudinally extending legs interconnected at one pair of ends by means of an integral bight portion, said first means comprising said bight portion and said laterally projecting abutment, the latter being engageable with the former upon relative movement of said members to their extended positions.

2. The combination of claim 1 wherein said first and second members comprise tubular members, said second member being telescoped within said first member, said U-shaped member being secured within said first member and having its closed end telescoped into said second member, said laterally projecting abutment comprising an elongated abutment member secured diametrically through said second member and disposed between the legs of said U-shaped member.

3. The combination of claim 2 wherein said first and second members are rectangular in cross-sectional shape and said second member is snugly telescoped within said first member, whereby relative rotation of said first and second members about their longitudinal axes is prevented.

4. The combination of claim 3 wherein said second member is telescoped into a first end of said first member, the second end of said first member having a pair of opposite side reinforcing plates secured therein, the free ends of said U-shaped member being secured to said reinforcing plates.

5. The combination of claim 1 wherein said first and second members comprise tubular members, said second member being telescoped within said first member, said U-shaped member being secured within said first member and having its closed end telescoped into said second member, said laterally projecting abutment comprising an elongated abutment member secured diametrically through said second member and disposed between the legs of said U-shaped member, said elongated abutment member comprising a tubular member secured diametrically through said first member, said second member having a pair of diametrically opposite apertures formed therethrough with which said tubular abutment member is registered when said sections are in their full retracted positions, and an elongated locking member removably secured through said apertures and tubular abutment member.

6. The combination of claim 5 wherein said tubular abutment member is vertically disposed, an upstanding sleeve secured to the upper side of said second member about a corresponding aperture, said elongated locking member being upwardly removable through said tubular abutment member, and elongated flexible tension means limiting upward movement of said elongated locking member to a position with the lower end thereof disposed below the upper end of said sleeve.

7. A towing tongue including inner and outer partially relatively telescoped and longitudinally shiftable tubular members including remote ends for securement to a towing vehicle and a towed vehicle, said first and second members including first coacting means operative to limit movement of said members toward fully telescoped positions and second coacting means limiting relative extension of said members, said second means including a U-shaped member secured within the non-telescoped end of said outer member with the free ends of the legs of said U-shaped member anchored to said outer member and the closed end of said U-shaped member projecting into the corresponding end of said inner member, and a transverse abutment member secured within said inner member between the legs of said U-shaped member and with which the closed end of said U-shaped member is engageable to limit relative extension of said inner and outer members.

8. The combination of claim 7 wherein said abutment member comprises a transverse tube extending and secured to opposite wall portions of said inner member, said inner member including transversely registered openings formed in said opposite wall portions with which the opposite ends of said tube are registered, said outer member including opposite side transversely registered openings with which the ends of said tube are registered when said inner and outer tubular members are in their maximum relatively telescoped positions, and a lock pin removably receiveable through said openings in said outer tubular member and said tube in order to lock said tubular members in their maximum telescoped positions.

* * * * *